United States Patent
Ben Trad et al.

(10) Patent No.: US 11,486,190 B2
(45) Date of Patent: Nov. 1, 2022

(54) HIGH PERFORMANCES VACUUM INSULATING GLAZING UNIT

(71) Applicants: AGC GLASS EUROPE, Louvain-la-Neuve (BE); AGC INC., Chiyoda Ku (JP); AGC FLAT GLASS NORTH AMERICA, INC., Alpharetta, GA (US); AGC VIDROS DO BRASIL LTDA, Sao Paulo (BR)

(72) Inventors: Abderrazek Ben Trad, Woluwe Saint-Lambert (BE); Julien Jeanfils, Corbais (BE); Pierre Schneider, Saint Christophe sur le Nais (FR)

(73) Assignees: AGC GLASS EUROPE, Louvain-la-Neuve (BE); AGC INC., Chiyoda-ku (JP); AGC FLAT GLASS NORTH AMERICA, INC., Alpharetta, GA (US); AGC VIDROS DO BRASIL LTDA, Sao Paulo (BR)

( * ) Notice: Subject to any disclaimer, the term of this patent is extended or adjusted under 35 U.S.C. 154(b) by 0 days.

(21) Appl. No.: 17/058,009

(22) PCT Filed: May 22, 2019

(86) PCT No.: PCT/EP2019/063196
§ 371 (c)(1),
(2) Date: Nov. 23, 2020

(87) PCT Pub. No.: WO2019/224238
PCT Pub. Date: Nov. 28, 2019

(65) Prior Publication Data
US 2021/0214994 A1    Jul. 15, 2021

(30) Foreign Application Priority Data
May 25, 2018 (EP) .................................... 18174308

(51) Int. Cl.
*E06B 3/66* (2006.01)
*E06B 3/663* (2006.01)
*E06B 3/677* (2006.01)

(52) U.S. Cl.
CPC ........ *E06B 3/6612* (2013.01); *E06B 3/66304* (2013.01); *E06B 3/6775* (2013.01); *E06B 2003/66338* (2013.01)

(58) Field of Classification Search
CPC .. E06B 3/6675; E06B 3/66304; E06B 3/6612; E06B 2003/66338
See application file for complete search history.

(56) References Cited

U.S. PATENT DOCUMENTS 9,863,184 B1    1/2018  Voss-Andreae
2009/0074997 A1*  3/2009  Stark ................... E06B 3/66304
                                                      428/34

(Continued)

FOREIGN PATENT DOCUMENTS

DE    20 2011 101 242 U1    10/2011
WO    WO-2013172034 A1 *  11/2013 ............. C03C 27/06

(Continued)

OTHER PUBLICATIONS

International Search Report dated Jun. 18, 2019 in PCT/EP2019/063196 filed on May 22, 2019.

*Primary Examiner* — Theodore V Adamos
(74) *Attorney, Agent, or Firm* — Oblon, McClelland, Maier & Neustadt, L.L.P.

(57) ABSTRACT

A vacuum insulating glazing unit comprising a planar area, first and second glass panes, k discrete spacers distributed over the planar area and positioned between the first and second glass panes, wherein k∈ℕ and k>8, and a peripheral bonding seal hermetically sealing the distance between the first and second glass panes defining an internal volume under vacuum, enclosed between the first and second glass (Continued)

panes and bounded by an inner perimeter of the peripheral bonding seal defining the planar area. The inner perimeter has a substantially rectangular geometry with a length, L, a width, W, with L≥W. The discrete spacers are arranged according to the stress field lines of the combination of atmospheric pressure stresses, $\sigma p$, applied by the atmospheric pressure on the surface of the vacuum insulating glazing, and of thermal stresses, $\sigma t$, resulting from a temperature difference between exterior and interior environments.

20 Claims, 6 Drawing Sheets

(56) References Cited

U.S. PATENT DOCUMENTS

| | | | | |
|---|---|---|---|---|
| 2014/0335291 | A1* | 11/2014 | Hasegawa | E06B 3/6612 |
| | | | | 428/34 |
| 2016/0138324 | A1* | 5/2016 | Lameris | E06B 3/66342 |
| | | | | 52/786.13 |
| 2016/0160555 | A1* | 6/2016 | Petit | E06B 3/6612 |
| | | | | 52/204.593 |
| 2021/0002949 | A1* | 1/2021 | Ishibashi | C03C 27/10 |

FOREIGN PATENT DOCUMENTS

| | | | |
|---|---|---|---|
| WO | WO 2016/089961 A1 | 6/2016 | |
| WO | WO-2016130854 A1 * | 8/2016 | B23K 1/06 |

* cited by examiner

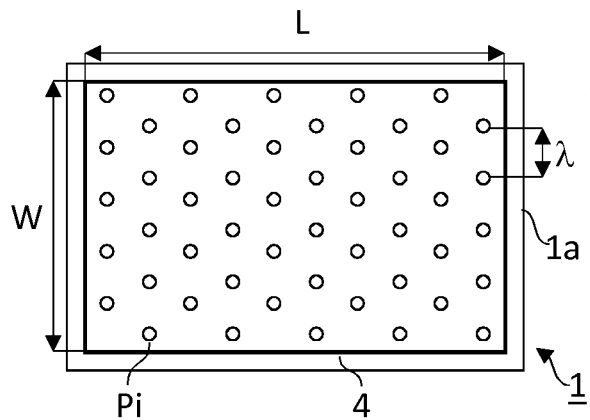
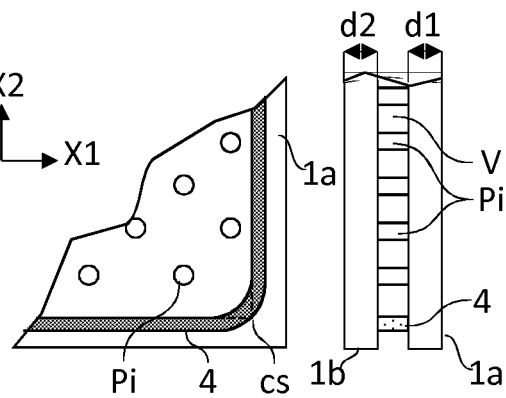
FIG.1(a) FIG.1(b) FIG.1(c)
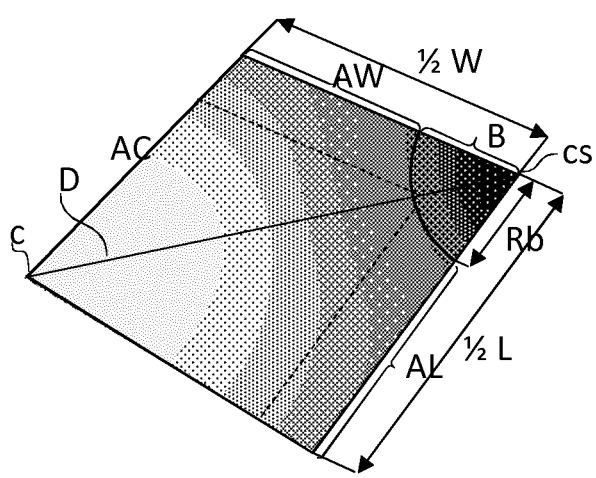
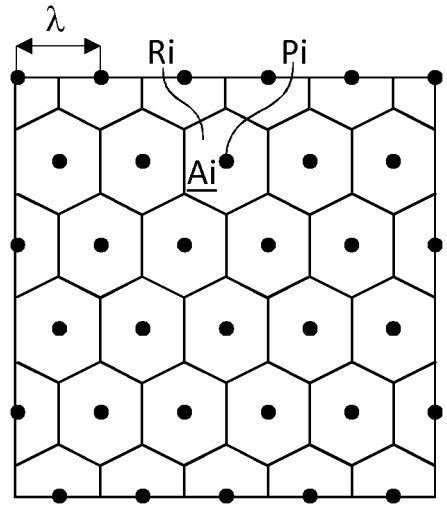
FIG.2 FIG.3(a)
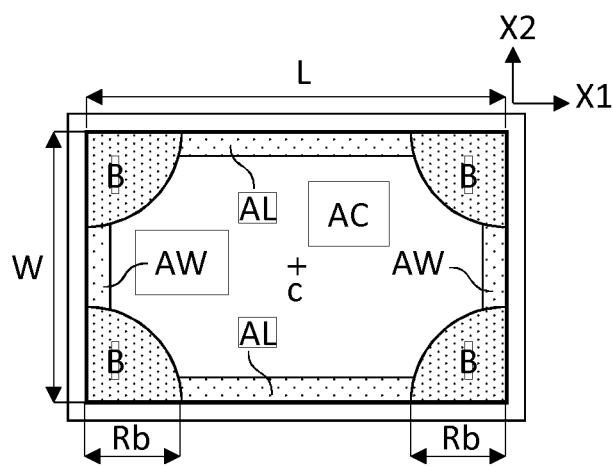
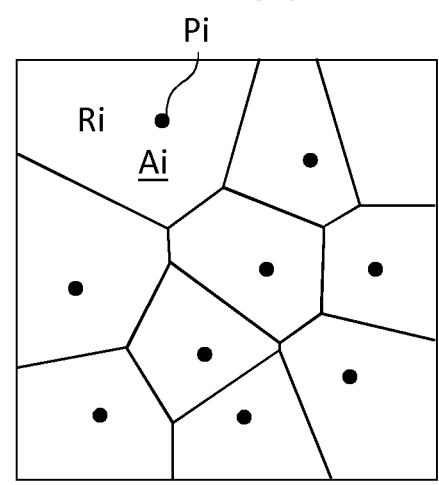
FIG.4 FIG.3(b)

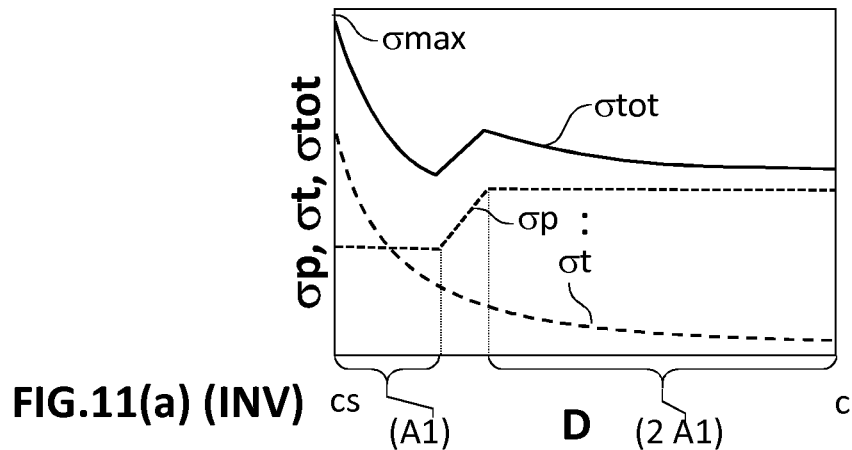
FIG.11(a) (INV)
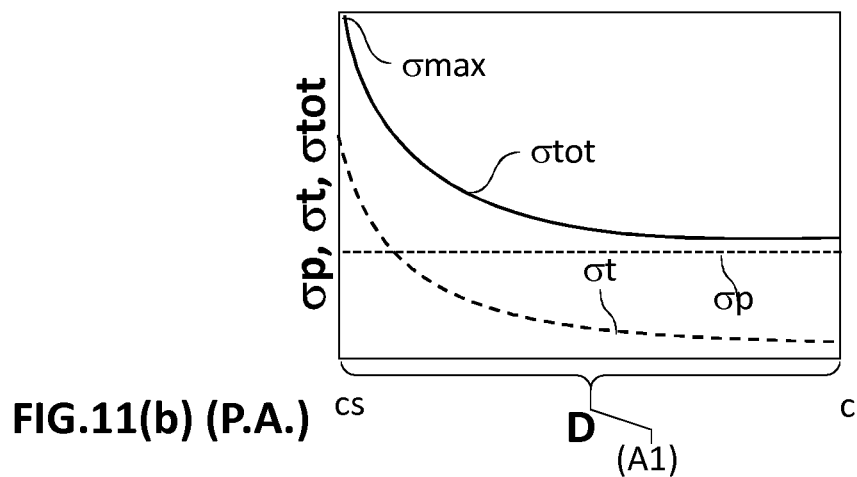
FIG.11(b) (P.A.)
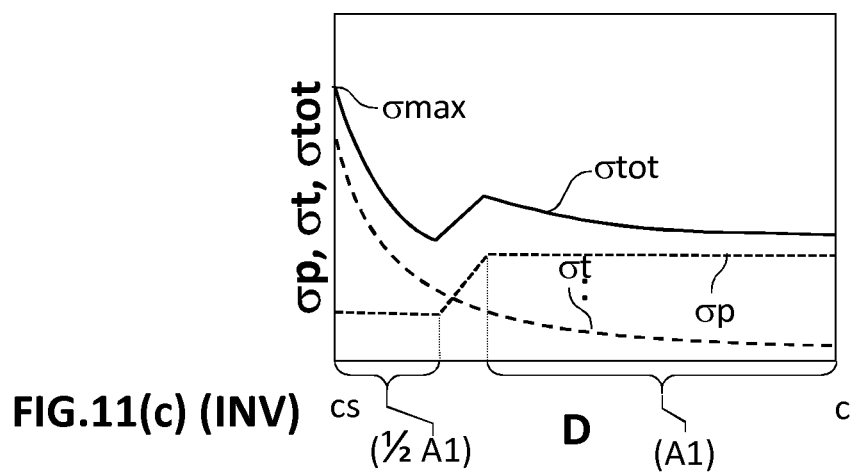
FIG.11(c) (INV)

HIGH PERFORMANCES VACUUM INSULATING GLAZING UNIT

TECHNICAL FIELD

The present invention concerns a vacuum insulating glazing unit (VIG) having particularly high thermal insulating properties. The number of discrete spacers used for keeping a first glass pane apart from a second glass pane is reduced and their distribution over a surface of the VIG is optimized to improve its thermal insulation performances and to ensure mechanical stability even when the VIG is exposed to a high temperature difference between the interior and exterior environments.

BACKGROUND OF THE INVENTION

Vacuum insulating glazing unit typically comprises two spaced apart sheets or panes of glass, having a "vacuum", i.e. a low-pressure space at a pressure less than atmospheric pressure, arranged between them. These sheets are interconnected by a peripheral bonding seal and an array of supporting discrete spacers, also designated as spacers or pillars, that holds said sheets a certain distance apart, typically in the range of between 50 μm and 1000 μm, preferably between 500 μm and 500 μm and more preferably between 50 μm and 150 μm.

There are several difficulties to address in the design and production of low pressure evacuated windows: for example, to achieve a low level of vacuum and to maintain it over a long period of time, it is necessary to make a seal around the perimeter of the window using materials which have extremely low permeability to gases and negligible outgassing over long periods of time. In addition, an array of discrete spacers must be provided between the sheets of glass to ensure sufficient mechanical strength to withstand atmospheric pressure while maintaining the panes of glass spaced apart.

Within the VIG, the first glass pane has an internal surface and an external surface. The second glass pane has an internal surface and an external surface. The internal surfaces are facing the internal volume of the VIG and are in contact with the spacers. The external surfaces are facing the exterior of the VIG.

Resistance of a VIG to the loads, it is exposed to during its service life, is an essential requirement which must be fulfilled. Excluding accidental loads, like impacts, a VIG is mainly exposed to two types of loads: atmospheric pressure load inducing atmospheric pressure stresses, σp, and a thermal expansion induced load caused by a temperature difference across the VIG thickness, between the outer surfaces of the first and second glass panes (e.g., between an interior and an exterior environments or between a cold room and a temperate room), which generates thermal stresses, σt, on the surfaces of the said glass panes.

For the purpose of the present invention of designing VIG's of high thermal insulating properties, only the tensile stresses on the surfaces of the glass panes have been considered. Indeed, as known by the persons skilled in the art, the tensile stresses are the major cause of cracks formation in the glass panes which eventually lead to the fracture point. Moreover, only the tensile stresses on the external surfaces are considered. Indeed, the internal volume of a VIG is under vacuum and therefore is essentially free of water. It is well known by the persons skilled in the art that the internal surfaces of the VIG, are substantially thus more mechanically stable than the outer surfaces, because not exposed to moisture or water vapour.

Atmospheric Pressure Stress

The atmospheric pressure stresses are the result of a uniform pressure of about $10^5$ Pa (atmospheric pressure) applied on the external surfaces of the glass panes composing the VIG above the discrete spacers, because the internal surfaces of the panes are exposed to a vacuum whilst the external surfaces of the panes are exposed to atmospheric pressure bending the sheets towards one another. The presence of the discrete spacers separating the two glass panes, however, prevents the two glass panes from contacting, but induces permanent tensile stresses on the external surfaces of the glass panes above each discrete spacer. The atmospheric pressure stress, σpi, generated above a discrete spacer, Pi, on the external surface of a glass pane is well known and for a square array of discrete spacers separated from one another by a pitch, λ, this stress can be characterized by the expression, $\sigma_p = 0.11 \lambda^2/d^2$ [MPa], wherein d is the thickness of the glass pane. For example, the (tensile) atmospheric pressure stresses applied on the external surfaces of a VIG composed of a first and second glass panes of thickness, d=5 mm, and discrete spacers arranged in a square array of pitch, λ=30 mm can be of the order of 4 MPa. The distribution of atmospheric pressure stresses, σpi, is composed of discrete areas located above each spacer. Since the number of spacers per unit area is quite high, and for simplifying the calculations and representations, the distribution of atmospheric pressure stresses, σpi, is treated herein as a continuous distribution of atmospheric pressure stresses, σp. For example, a 1000×1000 mm VIG with spacers arranged in a square array of pitch, λ=20 mm, comprises k=2500 spacers.

It can be seen from the equation for σp, that the atmospheric pressure stress induced above a discrete spacer decreases when the pitch λ decreases or, in other words, when the number of discrete spacers increases. Each discrete spacer, however, forms a thermal bridge between the first and second glass panes. Even with discrete spacers made of low conducting materials, thermal conductivity through discrete spacers is always higher than through the vacuum gap. Increasing the number of discrete spacers therefore decreases the thermal insulation of the VIG.

Strictly speaking, the "pitch, λ," is only used for characterizing square arrays of discrete spacers. For sake of conciseness, the definition of the "pitch, λ," is extended in the present document for any arrangement of spacers as the shortest distance separating a given spacer from any of its neighbours. This 'unofficial' definition respects the original definition applicable to square arrays and allows an at least partial characterization of any arrangement of discrete spacers.

Thermal Induced Stress

Thermal induced stresses occur as soon as there is a temperature difference between the temperature, T1, of the external surface of the first glass pane and the temperature, T2, of the external surface of the second glass pane, when the first and second glass panes are not free to move relative to one another, e.g., because of the peripheral bonding seal (4) or because of a frame clamping a perimeter of the VIG. The thermal stresses increase with increasing differences between the temperatures, T1 and T2. Thermal stresses, σt, can be induced on the glass panes for example, when a VIG is exposed to severe temperature differences between interior and exterior spaces, typically when the VIG separates an interior from an exterior environment. In most stringent conditions, the difference between the interior and exterior temperatures can reach up to 40° C. and more. When exposed to different temperatures, the two glass panes expand differently. Since they are not free to move relative to one another because, on the one hand, of the peripheral bonding seal and, on the other hand, of the frame clamping the VIG, the different thermal expansions of the two glass panes of the VIG bend the panes and therefore create stresses. Unlike the atmospheric pressure stress, there is no analytical expression characterizing the thermal stresses, σt, over the external surfaces of a VIG and they do not depend on the number and arrangement of the discrete spacers. In continuation, the thermal stresses, σt, refer to the tensile stresses induced by a temperature gradient on the external surface of a first pane exposed to a high temperature, wherein the temperature gradient is created by exposure of the first pane of the VIG to the high temperature and of a second pane to a low temperature.

Discrete spacers must be distributed over the internal surfaces of the glass panes composing the VIG to ensure mechanical stability against at least the atmospheric pressure load Most VIG's to date have discrete spacers distributed according to periodic patterns, typically square, centred square, or (centred-) hexagonal patterns. The thermal stresses, however, which add up to the atmospheric pressure stresses, are not distributed homogeneously over the planar surface. Consequently, distributing discrete spacers according to a regular periodic pattern cannot be an optimal option.

DE202011101242U1 describes a VIG with a distribution of (centred-) hexagonally arranged spacers extending along an inwardly spiralling elliptical helix. This arrangement is described as approximately following the pattern of the stress field created by a strong load applied to the centre of the glazing. Important is to reinforce the edges with centred-hexagonally arranged spacers, while discrete spacers are arranged hexagonally (non-centred) in the central region of the vacuum insulating glazing. The discrete spacers' distribution described in said utility model does not seem to follow the pattern of thermal stress fields.

As discussed supra, discrete spacers are detrimental to the thermal properties of the VIG's, because they form as many thermal bridges between the two glass panes as there are spacers. It is therefore desirable to reduce the number of discrete spacers to enhance thermal insulation, and to optimize their distribution over the surface of the vacuum insulating glazing to ensure mechanical stability. The present invention proposes to match the distribution of discrete spacers with the distribution of the thermal stresses over the area of the vacuum insulating glazing. To this purpose, the thermal stresses distribution have been characterized numerically by finite element modelling (fem), to distinguish areas exposed to higher levels of stress from areas exposed to lower levels of stress. This and other aspects of the present invention are described more in details in the following sections.

SUMMARY OF THE INVENTION

The appended independent claims define the present invention. The dependent claims define preferred embodiments. In particular, the present invention concerns a vacuum insulating glazing unit (VIG) comprising a planar area and comprising:
(a) a first glass pane and a second glass pane;
(b) k discrete spacers (Pi) distributed over the planar area and positioned between the first and second glass panes and maintaining a distance between the first and the second glass panes, each of said discrete spacers (Pi) defining a cell (Ri) having a cell area (Ai) and forming in combination with the cells associated with all the discrete spacers, a Voronoi tessellation characterized by a cell area distribution, wherein k∈ℕ and k>8;
(c) a peripheral seal hermetically sealing the distance between the first and second glass panes defining an internal volume, V, enclosed between the first and second glass panes and bounded by an inner perimeter of the peripheral bonding seal defining the planar area, the inner perimeter having a substantially rectangular geometry extending over a length, L, along a longitudinal axis, X1, and over a width, W, along a transverse axis, X2, normal to the longitudinal axis, X1, with L≥W, wherein the internal volume is under vacuum.

The planar area is divided as follows:
four corner regions (B), each having a quarter-circular geometry of radius, Rb<W/2, and each centred on a corner of the rectangular inner perimeter of the peripheral bonding seal, and
a complementary region (A) covering the planar area excluding the four corner areas and itself divided into,
A first longitudinal stripe region (AL) extending between a first and second corner regions and a second longitudinal stripe region (AL) extending between a third and fourth corner regions, each longitudinal stripe region extending along the longitudinal axis, X1, adjacent to a longitudinal edge of the planar area and having a width measured from the longitudinal edge along the transverse axis, X2, equal to 0.1 W,
A first transverse stripe region (AW) extending between the first and a third corner regions and a second transverse stripe region (AW) extending between the second and a fourth corner regions, each transverse stripe region extending along the transverse axis, X2, adjacent to a transverse edge of the planar area and having a width measured from the transverse edge along the longitudinal axis, X1, equal to 0.1 W,
A central region (AC) covering the area of the complementary region (A) excised of the first and second longitudinal stripe regions (AL) and of the first and second transverse stripe regions (AW).

The $10^{th}$ percentile, $S_{B10}$, of the cell area distribution of the cells located in each of the four corner regions (B) is smaller than the $10^{th}$ percentiles, $S_{AC10}$, and $S_{AL10}$ and/or $S_{AW10}$, of the cell area distributions of the cells located in the central region (AC), and in each of the first and second longitudinal stripe regions (AL), and/or in each of the first and second transverse stripe regions (AW), respectively, wherein the value of $S_{B10}$ $S_{AL10}$, and $S_{AW10}$ are determined ignoring the cell areas of all the cells adjacent to the inner perimeter.

The $10^{th}$ percentile, $S_{AC10}$, of the cell area distribution of the cells located in the central region (AC), must be larger than or equal to the $10^{th}$ percentiles, $S_{AL10}$ and $S_{AW10}$ of the first and second longitudinal and transverse stripe regions (AL, AW).

A cell (Ri) is enclosed in a region (AC, AL, AW, B),
if the corresponding discrete spacer (Pi) is comprised within said region, or
in case the corresponding discrete spacer is at an intersection between two regions (AC, AL, AW, B), the cell (Ri) is enclosed in the region comprising the largest fraction of the cell area (Ai), and
in case the corresponding discrete spacer is at an intersection between two regions (AC, AL, AW, B) and the cell area is evenly distributed between the two regions, said cell area is ignored for the determination of the 10$^{th}$ percentiles, $S_{B10}$, $S_{AC10}$, $S_{AL10}$, and $S_{AW10}$.

In a preferred embodiment, the cell areas of all the cells located in each of the four corner regions (B), which are adjacent to the inner perimeter are smaller than or equal to the cell areas of all the cells directly adjacent thereto. Depending on the type of frame supporting the vacuum insulating glazing, high thermal stresses may concentrate adjacent to the edges of the corner regions. Decreasing the cell areas in these regions, relieves the glass panes from part of the atmospheric pressure stresses.

Because the thermal stresses can be substantially lower in the central region (AC) than in the corner regions (B), it is preferred that the 90$^{th}$ percentile, $S_{AC90}$, of the cell area distribution of the cells located in the central region (AC) is larger than m times the 10$^{th}$ percentile, $S_{B10}$, of the cell area distribution of the cells located in each of the four corner regions (B) ($S_{AC90}$>m$S_{B10}$), wherein m≥1.6, preferably m≥1.8, more preferably m≥2.0.

The value of Rb actually depends on the level of thermal stress expected during the service life of a vacuum insulating glazing. For vacuum insulating glazing to be exposed to severe temperature difference between interior and exterior environments, the corner region wherein the level of thermal stress is high will be broader, resulting in a higher value of Rb. In practice, it is preferred that Rb be comprised between 20% and 40% of the width, W, typically 30%±5% of the width, W, and can be comprised between 15% and 35% of the length, L. In terms of absolute sizes, Rb can be comprised between 80 and 400 mm, more preferably between 100 and 300 mm.

The 10$^{th}$ percentile $S_{B10}$ of the cell areas of the cells located in the corner regions (B) is preferably comprised between 20 and 5000 mm$^2$, preferably between 25 and 3600 mm$^2$, more preferably between 100 and 2500 mm$^2$, most preferably between 150 and 900 mm$^2$. By contrast, the 10$^{th}$ percentile $S_{AC10}$ of the cell areas of the cells located in the central region (C) is preferably comprised between 50 and 9000 mm$^2$, preferably between 100 and 7200 mm$^2$, more preferably between 400 and 5000 mm$^2$, most preferably between 500 and 1800 mm$^2$.

Because the thermal stresses are higher at the edges of the VIG than in the central region, the 90$^{th}$ percentiles, $S_{AL90}$, and $S_{AW90}$, of the cell area distributions of the cells located in each of the first and second longitudinal stripe regions (AL), and/or in each of the first and second transverse stripe regions (AW), respectively, are preferably smaller than the 90$^{th}$ percentile, $S_{AC90}$, of the cell area distribution of the cells located in central region (AC).

The cells areas (Ai) intercepting a diagonal of the planar area preferably increase monotonically from a corner to the centre of the planar area, optionally including one or more plateaux of constant values, ignoring the cells adjacent to an edge of the planar area.

The present invention also concerns a method for producing a vacuum insulating glass unit according to any one of the preceding claims, comprising the following steps:
- Providing a first and second glass panes (1a,1b) of known mechanical and thermal properties and of given thickness, d,
- Calculating the maximum Voronoi cell area, Ai_max, for yielding a maximum acceptable value of the atmospheric pressure stress each glass pane of the VIG can resist, for example, using the equation σp=0.11 Ai_max/dj$^2$ [MPa] proposed by the present inventors which approximates the atmospheric pressure stress induced above a discrete spacer based on the Vonoroi cell area of a said discrete spacer and which is applicable to any type of arrangement of discrete spacers, wherein dj is the thickness of the first or second glass pane (j=1 or 2). For a square array arrangement of discrete spacers, the Voronoi cell area, Ai=λ$^2$, wherein λ is the pitch. Replacing Ai_max in said equation by λmax$^2$, yields σp=0.11 λmax$^2$/d$^2$ [MPa] as proposed in the literature.
- Defining a discrete spacer distribution characterized by the maximum cell area, Ai_max, in the central region (AC), and determining the 10$^{th}$ percentile, $S_{AC10}$, of this cell area distribution of discrete spacers in the central region (AC),
- Defining a discrete spacer distribution in the first and second longitudinal regions (AL) and in the first and second transverse regions (AW) characterized by 10$^{th}$ percentiles, $S_{AL10}$, $S_{AW10}$ of the cell areas of the discrete spacers located in the longitudinal and transverse stripe regions (AL, AW), which are lower than or equal to the 10$^{th}$ percentile, $S_{AC10}$, of the cell areas of the discrete spacers located in the central region (AC),
- Defining a discrete spacers distribution in the four corner regions (B) characterized by a 10$^{th}$ percentile, $S_{B10}$, of the cell areas of the discrete spacers located in each corner region (B), which is lower than the 10$^{th}$ percentile, $S_{AC10}$, $S_{AL10}$, and $S_{AW10}$ of the cell areas of the discrete spacers located in the central region (AC) and in the longitudinal and transverse stripe regions (AL, AW),
- Positioning k discrete spacers onto a surface of the first glass pane (1a) according to the foregoing discrete spacers distribution, and applying a peripheral bonding seal (4) over said surface, defining a perimeter of a rectangular planar area,
- Coupling the second glass pane (1b) over the k discrete spacers and peripheral bonding seal (4), leaving a gap between the first and second glass panes and bounded by the peripheral seal,
- Evacuating gas out of the gap between first and second glass panes to reach a pressure below 1 mbar, Wherein $S_{B10}$, is determined ignoring the cells adjacent to an edge of the rectangular planar area, and wherein $S_{AL10}$ and $S_{AW10}$ are determined ignoring the cells adjacent to an edge of the rectangular planar area.

The method can further comprise the following steps;
- determining the 90$^{th}$ percentile, $S_{AC90}$, of the cell areas of discrete spacers located in the central region (AC), and
- defining a discrete spacers distribution in the four corner regions (B) characterized by a 10$^{th}$ percentile, $S_{B10}$, of the cell areas of the discrete spacers located in each corner region (B), which is lower than or equal to 1/m times the 90$^{th}$ percentile, $S_{AC90}$, of the cell areas of the discrete spacers located in the central region (AC), wherein m≥1.6, preferably m≥1.8, more preferably m≥2.0.

BRIEF DESCRIPTION OF THE FIGURES

For a fuller understanding of the nature of the present invention, reference is made to the following detailed description taken in conjunction with the accompanying drawings in which:

FIG. 1: shows a vacuum insulating glazing unit (VIG) (a) front view, (b) zoom of FIG. 1(a) at a corner of the VIG, and (c) cross-section.

FIG. 2: shows an example of thermal stresses distribution

FIG. 3: shows examples of a Voronoi tessellations for (a) a centred-hexagonal array of discrete spacers, and (b) for a random distribution of discrete spacers.

FIG. 4: shows the division of the planar area used to characterize the cell area distribution of a VIG according to the present invention, with the four corner regions (B), the central region (AC), and the longitudinal and transverse stripes regions (AL, AW).

FIG. 11: compares the stresses applied along a diagonal of a VIG (a) according to the present invention, (b) according to the prior art, (c) according to an alternative embodiment of the present invention.

DETAILED DESCRIPTION OF THE INVENTION

Figure 5A:
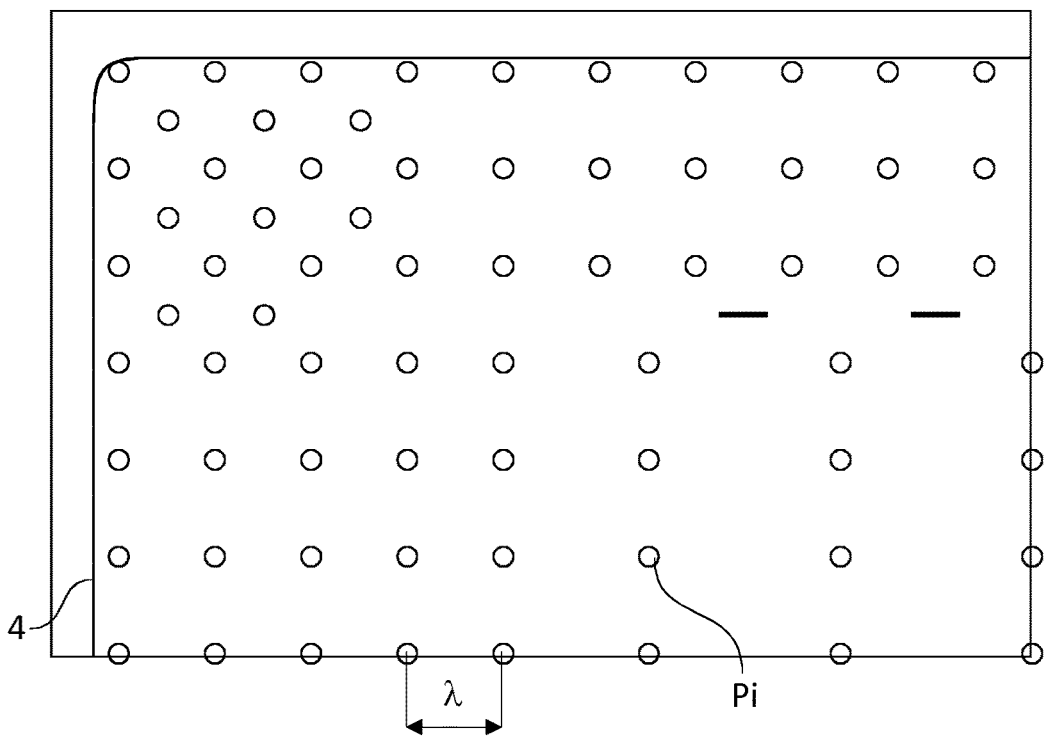
FIG. 5: shows an example of VIG comprising a discrete spacers distribution according to the present invention, (a) front view and (b) same view, with corresponding Voronoi cells and regions.

The present invention concerns vacuum insulating glazing unit (VIG) comprising a planar area and comprising a first glass pane (1a) and a second glass pane (1b) as illustrated in FIG. 1(c). k discrete spacers (Pi) are distributed over the planar area and positioned between the first and second glass panes and maintaining a distance between the first and the second glass panes (1a, 1b), wherein k∈ℕ and k>8, preferably k>100, more preferably k>400. FIG. 1(a) shows a centred-hexagonal distribution of discrete spacers of a state of the art, VIG. As discussed supra, the pitch, λ, is herein defined as the shortest distance between two adjacent discrete spacers. A peripheral bonding seal (4) hermetically seals the distance between the first and second glass panes defining an internal volume, V, enclosed between the first and second glass panes and bounded by an inner perimeter of the peripheral bonding seal defining a planar area. The inner perimeter has a substantially rectangular geometry extending over a length, L, along a longitudinal axis, X1, and over a width, W, along a transverse axis, X2, normal to the longitudinal axis, X1, with L≥W, wherein the internal volume is under vacuum, In practice and as illustrated in FIG. 1(b), the peripheral bonding seal may not form sharp right angles at the corners as it may form a radius of curvature. The inner perimeter and planar area are considered to be inscribed in a rectangle with 90°-corners (cs) (cf. white dashed line at the corner (cs) of FIG. 1(b)). In continuation, when a geometrical reference to a rectangle associated with the planar area, such as a corner (cs) or a diagonal (D), such reference is made with respect to said rectangle in which the planar area is inscribed.

The dimensions of a VIG according to the present invention include lengths, L, preferably comprised between 1000 and 5000 mm, preferably between 2000 and 4000 mm, and widths, W, comprised between 500 and 3000 mm, preferably between 1000 and 2500 mm.

Thermal Stresses Distribution

FIG. 2 shows a graphical representation of the thermal stresses, σt, distribution over a quarter of a VIG clamped in a wooden frame and of length, L, and width, W, with L=W=1000 mm, formed by two 5 mm thick glass panes exposed to a temperature difference between interior and exterior spaces of 40° C. FIG. 2 represents the tensile stresses distribution induced on the external surface of the VIG pane exposed to a higher temperature. Stress levels increase from the white area at about 0 MPa, to the darkest area at about 24 MPa. This data is original and is the result of internal work by the inventors. As discussed supra, for discrete spacers arranged in a square array of pitch, λ=30 mm, the atmospheric pressure stress, σp, can be of the order of 4 MPa.

Division of the Planar Area

The planar area can be divided in several zones to reflect the stresses distribution, including.

four corner regions (B), each having a quarter-circular geometry of radius, Rb<W/2 and preferably Rb>W/10, and each centred on a corner of the rectangular inner perimeter of the peripheral bonding seal (4), a complementary region (A) covering the planar area excluding the four corner areas. The complementary region (A) is further divided into three sub-regions:

A first longitudinal stripe region (AL) extending between a first and second corner regions and a second longitudinal stripe region (AL) extending between a third and fourth corner regions, each longitudinal stripe region extending along the longitudinal axis, X1, adjacent to a longitudinal edge of the planar area and having a width measured from the longitudinal edge along the transverse axis, X2, equal to 0.1 W, A first transverse stripe region (AW) extending between the first and a third corner regions and a second transverse stripe region (AW) extending between the second and a fourth corner regions, each transverse stripe region extending along the transverse axis, X2, adjacent to a transverse edge of the planar area and having a width measured from the transverse edge along the longitudinal axis, X1, equal to 0.1 W, and A central region (AC) covering the area of the complementary region (A) excised of the first and second longitudinal stripe regions (AL) and of the first and second transverse stripe regions (AW), Voronoi Tesselation Each discrete spacer has a supporting effect on the glass panes over a given area of influence, bounded by areas of influence of the neighbouring discrete spacers. Such situation can be described using Voronoi cells forming a Voronoi tessellation. In mathematics, a Voronoi tessellation or diagram is a partitioning of a plane into regions based on distance to points in a specific subset of the plane. That set of points is formed by the k discrete spacers distributed over the planar area. For each discrete spacer there is a corresponding region consisting of all points closer to that discrete spacer than to any other. These regions are called "Voronoi cells" (Ri), or simply "cells" having a cell area (Ai), which defines the area of influence of each discrete spacer. A Voronoi tessellation formed by k cells is characterized by a cell area distribution. The cell areas (Ai) of a Voronoi tessellation increases with decreasing number, k, of discrete spacers per unit area. For example, a first VIG or a first portion of a VIG comprising a number k1 of discrete spacers smaller than a number k2 of discrete spacers of a second VIG or of a second portion of the VIG is characterized by a cell area distribution having a larger mean cell area than a second VIG or of a second portion of the VIG.

FIG. 3 shows two examples of Voronoi tessellations. FIG. 3(a) illustrates the Voronoi tessellation of an array of discrete spacers arranged at a regular pitch, λ, according to a centred-hexagonal distribution. The Voronoi cells are all hexagonal of same dimensions with the corresponding discrete spacer centred therein. FIG. 3(b) shows a random arrangement of discrete spacers. It can be seen that one and only one Voronoi tessellation can be associated to a given distribution of discrete spacers of any type.

Percentile

Figures 6, 7:
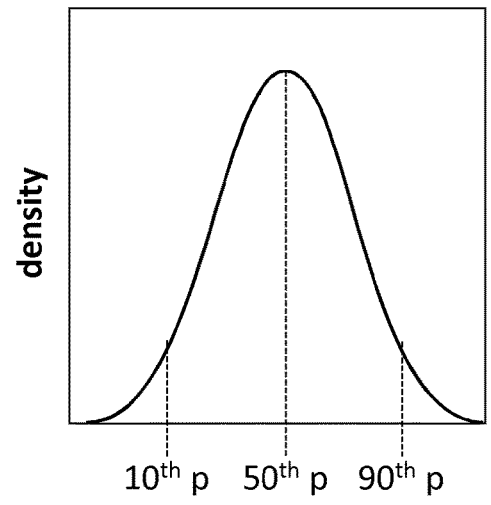
FIG. 6: shows a cell area distribution with the $10^{th}$, $50^{th}$, and $90^{th}$ percentiles indicated on the graph.
FIG. 7: table recording the various cells geometries in each region, their surface area (Ai), their rank i in the sorted list of values, the value of $n^{th}$ rank corresponding to the $10^{th}$ and $90^{th}$ percentiles, and the values of the areas of the $10^{th}$ and $90^{th}$ percentiles.

As illustrated in FIG. 6, the $P^{th}$ percentile of a list of N values of cell areas sorted from smallest to largest is herein defined as the smallest value in the list such that no more than P % of the data is strictly less than said smallest value, and at least P % of the N values of the cell areas is less than or equal to that smallest value, wherein P is comprised between 0 and 100. The $P^{th}$ percentile of the sorted list of N values of cell areas can be obtained by the nearest-rank method, which consists of determining the corresponding rank n of the k sorted values with the formula, n=N P/100. If the value of n obtained with this formula is not an integer, then n is rounded to the nearest integer. The cell area value of the $P^{th}$ percentile is the value listed at the (rounded) $n^{th}$ rank of the sorted list of N values of cell areas. It is clear that for N<100, it is possible that the same value be used for more than one percentile. The $50^{th}$ percentile is called the median, and the $1^{st}$ and $100^{th}$ percentiles are defined to be the smallest and largest values in the ordered list, respectively.

Figure 5B:
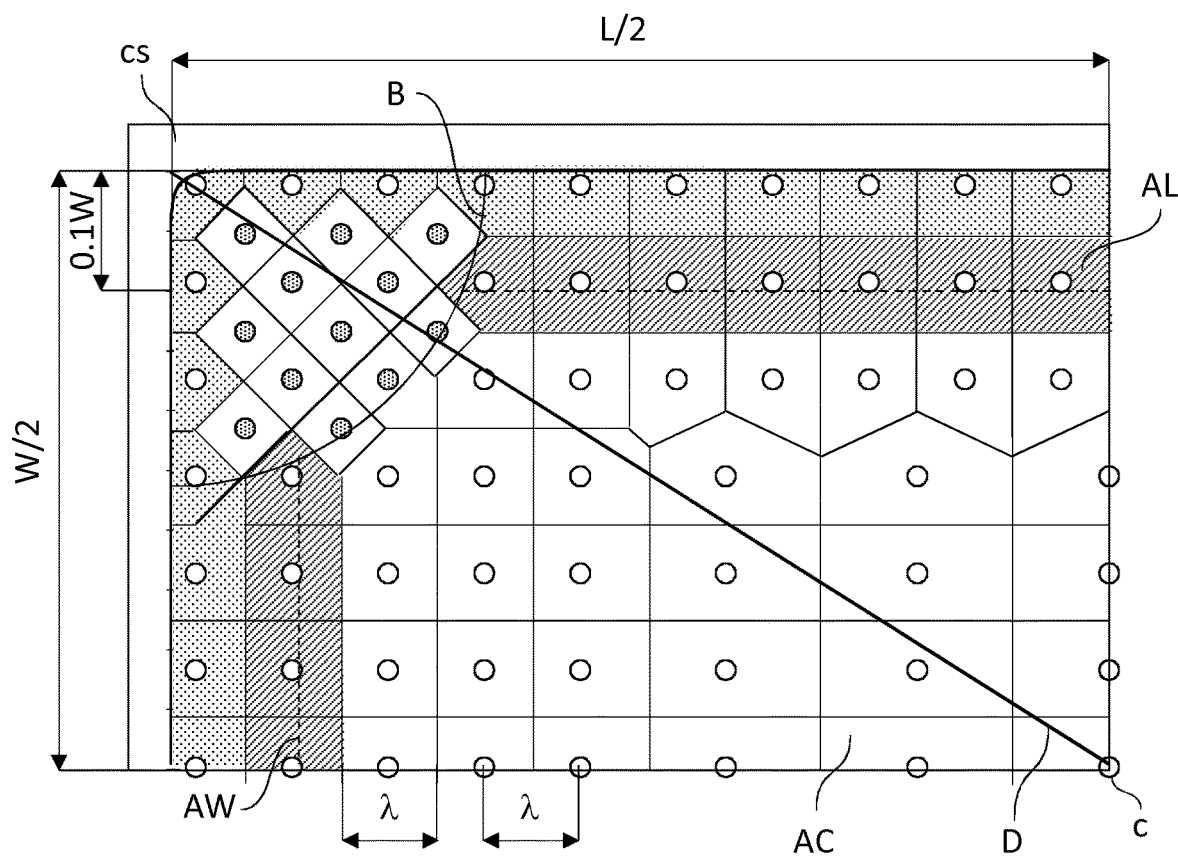

For example, referring to FIG. 5(b) and to the Table (a) of FIG. 7, there are 12 Voronoi cells included in the corner region of radius, Rb. There are 11 diamonds, each having a cell area Ai(B)=½ $\lambda^2$, with i=1 to 11, and one cell in the shape of a house, of cell area A12(B)=⅝ $\lambda^2$, where is the pitch of the square array of spacers present, e.g., in the longitudinal stripe region (AL). The $10^{th}$ percentile of this list of 12 values obtained by the nearest-rank method, is A1(B)=½ $\lambda^2$, which is the area value listed at the $n^{th}$ rank, wherein n=N P/100=12×10/100=round (1.2)=1. Similarly, the $10^{th}$ percentiles of the central region is the area value listed at rank, n=3, which is A3(AC)=$\lambda^2$. One Voronoi cell of the longitudinal stripe region (AL) is house shaped of cell area, A1(AL)=¾ $\lambda^2$, and 6 Voronoi cells are square of area Ai(AL)=$\lambda^2$, with i=2 to 7. Consequently the $10^{th}$ percentile of the region AL is equal to ¾ $\lambda^2$. All these results are summarized in the Tables (a)-(c) of FIG. 7.

Cell Area Distribution

A straightforward solution for increasing the resistance to atmospheric pressure of a VIG made of glass panes of given thicknesses is to increase the number of discrete spacers (Pi). Increasing the number of discrete spacers, however, is detrimental to the thermal insulation properties of the VIG. In order to reduce the number of discrete spacers, and thus enhance the thermal insulation properties of the VIG and, at the same time optimize the discrete spacers distribution over the planar area to ensure mechanical resistance to atmospheric pressure stresses and to thermal stresses, the following conditions are proposed in the present invention.

The $10^{th}$ percentile, $S_{B10}$, of the cell area distribution of the cells located in each of the four corner regions (B) is smaller than, the $10^{th}$ percentiles, $S_{AC10}$, of the cell area distributions of the cells located in the central region (AC), and the $10^{th}$ percentiles, $S_{AL10}$, of the cell area distributions of the cells located in each of the first and second longitudinal stripe regions (AL), and/or the $10^{th}$ percentiles, $S_{AW10}$, of the cell area distributions of the cells located in each of the first and second transverse stripe regions (AW).

The value of the $10^{th}$ percentile, $S_{AC10}$, of the cell area distributions of the cells located in the central region (AC), is larger than or equal to the $10^{th}$ percentiles, $S_{AL10}$ and $S_{AW10}$ of the first and second longitudinal and transverse stripe regions (AL, AW), The value of $S_{B10}$, $S_{AL10}$, and $S_{AW10}$ are determined ignoring the cell areas of all the cells adjacent to the inner perimeter (cf. dark shaded cells along the edges of the quarter glazing illustrated in FIG. 5(b)).

A cell (Ri) is enclosed in a region (AC, AL, AW, B),
  if the corresponding discrete spacer (Pi) is comprised within said region, or
  in case the corresponding discrete spacer is at an intersection between two regions (AC, AL, AW, B), the cell (Ri) is enclosed in the region comprising the largest fraction of the cell area (Sk), and
  in case the corresponding discrete spacer is at an intersection between two regions (AC, AL, AW, B) and the cell area is evenly distributed between the two regions, said cell area is ignored for the determination of the $10^{th}$ percentiles, $S_{B10}$, $S_{AC10}$, $S_{AL10}$, and $S_{AW10}$.

The cell areas of all the cells located in each of the four corner regions (B), which are adjacent to the inner perimeter are preferably smaller than or equal to the cell areas of all the cells directly adjacent thereto.

FIG. 5(a) illustrates an embodiment of the present invention, showing a quarter of a VIG presenting a specific spacers distribution, characterized by a lower pitch at the corner and a larger pitch in a central area, and an intermediate pitch between these two areas. This distribution approximately matches the thermal stresses distribution over the planar area, an example of which is illustrated in FIG. 2. The central region, with the largest pitch between discrete spacers must be dimensioned so as to withstand mainly the atmospheric pressure, since thermal stresses are nearly zero in that region (cf. FIG. 2). The shortest pitches are concentrated at the corners because the VIG must withstand a combination of atmospheric and thermal stresses of high magnitude in the corners.

FIG. 5(b) illustrates the same (quarter-) VIG with the same discrete spacers distribution as in FIG. 5(a), with identification of the corner region (B), central region (AC), and longitudinal and transverse stripe regions (AL, AW), as well as the Voronoi cells of the discrete spacers and the diagonal, D. In the illustration, Rb=0.25 W. In practice, Rb can be comprised between 20% and 40% of the width, W, typically 30%±5% of the width, W. Compared with the length of the planar area, Rb can be comprised between 15% and 35% of the length, L, when L≠W. The radius, Rb, of the corner regions is preferably comprised between 80 and 400 mm, more preferably between 100 and 300 mm. The value of Rb greatly depends on the level of thermal stresses the VIG is designed to withstand mechanically. With high thermal resistance requirements, the value of Rb increases, whilst with low thermal resistance requirements, the value of Rb can decrease.

Figure 8:
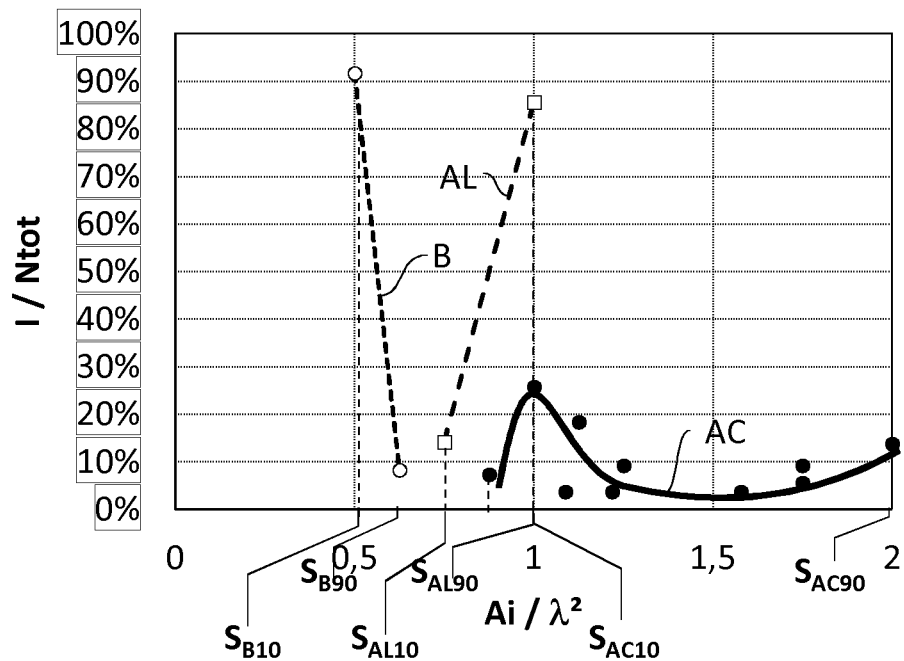
FIG. 8: shows the cell areas distribution of the B-, AC-, and AL-regions of the VIG of FIG. 5.

FIG. 8 illustrates the cell areas distributions of the vacuum insulating glazing illustrated in FIG. 5, in the corner regions (B) (=white circles and short dashed line), the central region (AC) (black circles and solid line) and the longitudinal stripe region (AL) (white squares and long dashed line). The values of the 10$^{th}$ and 90$^{th}$ percentiles of the cell areas in said regions are identified in the plot.

The discrete spacers taken into account for the determination of the 10$^{th}$ percentile, S$_{B10}$, of the B-region are shaded in FIG. 5(b). The cell areas of all the Voronoi cells, which are adjacent to the inner perimeter are ignored and identified in FIG. 5(b) with a dark shaded area. In the example of FIG. 5, two types of Voronoi cells only are considered for the determination of the 10$^{th}$ percentile, S$_{B10}$, of the B-region: eleven square cells of cell area, Ai=½ λ$^2$, and one house shaped cell of cell area, Ai=⅝ λ$^2$, as listed in the Table (a) of FIG. 7. As listed in the Table of FIG. 7, and illustrated in FIG. 8, the 10$^{th}$ percentile, S$_{B10}$, of the B-region in the example of FIG. 5 is S$_{B10}$=½ λ$^2$. The lower pitch described above with respect to FIG. 5 between spacers required in the B-region is reflected by the low value of the 10$^{th}$ percentile, S$_{B10}$, of the B-region compared with the rest of the VIG (cf. FIG. 8).

Referring to FIG. 5(b), all but one Voronoi cells of the longitudinal stripe region (AL) are identical; and are squares of pitch, λ, and one cell having a house shape has a cell area of ¾ λ$^2$ (cf. horizontal dashed area on the top row in FIG. 5(b)). The 10$^{th}$ percentile of the cell areas in the AL-region is at rank, n=1 and is therefore: S$_{AL10}$, =¾ λ$^2$ (cf. Table (b) of FIG. 7 and FIG. 8).

As illustrated in the Table (c) of FIG. 7, the central region (AC) includes about 27 cells, with more than half (18) being square cells of cell area Ai=λ$^2$. As indicated in the Table (c) of FIG. 7, the nearest-rank method yields the value of the 10$^{th}$ percentile of the central region as being at rank, n=3, so that S$_{AC10}$=λ$^2$. The 90$^{th}$ percentile corresponds to the value at rank, n=25, yielding S$_{AC90}$=2λ$^2$ (cf. Table (c) of FIG. 7 and FIG. 8).

In the Tables of FIG. 7, there are fractions of cells because the calculations were made on the basis of a quarter of the VIG represented in FIG. 5, with cells overlapping with other quarters.

In a preferred embodiment, the 90$^{th}$ percentile, S$_{AC90}$, of the cell area distribution of the cells located in the central region (AC) is larger than m times the 10$^{th}$ percentile, S$_{B10}$, of the cell area distribution of the cells located in each of the four corner regions (B) (S$_{AC90}$>mS$_{B10}$), wherein m≥1.6, preferably m≥1.8, more preferably m≥2.0. The value of the ratio m=S$_{AC90}$ S$_{B10}$, should reflect the ratio, σp,max(AC)/σp,min(B), of the highest atmospheric stress, σp,max(AC), induced above the discrete spacers in the central region (AC) of the VIG (the thermal stress can be approximated to zero in the central region) to the lowest atmospheric pressure stress, σp,min(B), induced above the spacers at the corner regions (B) of the VIG. The values of the atmospheric pressure stress, σp, are highest above the spacers located in the central region (AC), because the Voronoi cell areas, Ai, of the Voronoi cells of the central areas are the largest in the planar area, whilst it is lowest at the four corner regions (B), because the Voronoi cell areas, Ai, of the Voronoi cells of the corner regions are smallest there. By contrast, as shown in FIG. 2, the thermal stresses, Gt, are highest in the corner regions (B), and lowest at the central region (AC). As can be seen in the Tables (a)&(c) of FIG. 7, the value of the ratio m=S$_{AC90}$/S$_{B10}$, for the discrete spacers distribution illustrated in FIG. 5 is equal to 2λ/λ=2.

In many cases, the 10$^{th}$ percentile, S$_{B10}$, of the cell areas of the Voronoi cells comprised within a corner region (B) can be comprised between 20 and 5000 mm$^2$, preferably between 25 and 3600 mm$^2$, more preferably between 100 and 2500 mm$^2$, most preferably between 150 and 900 mm$^2$. To give a better idea of the physical meaning of such values of the cell areas, if the spacers are arranged according to a square array, the pitch, λ, corresponding to said cell area ranges would be comprised between 4.5 and 71 mm, preferably between 5 and 60 mm, more preferably between 10 and 50 mm, most preferably between 12 and 30 mm.

The combined stress, σtot=(σp+σt), induced above each discrete spacer on a glass pane composing the VIG is composed of the sum of the atmospheric pressure stress, σp, and the thermal stress, σt. As discussed supra, the atmospheric pressure stress, σpi, above a given spacer, Pi, can be approximated by σp=0.11 Ai/dj$^2$ [MPa], (or σp=0.11λ/dj$^2$ [MPa] for square lattices), wherein dj is the thickness of the first or second glass pane (j=1 or 2). The thermal stress follows a trend as depicted in FIG. 2. A glass pane must be designed and dimensioned such that the combined stress, σtot=(σp+σt), does not exceed the bending strength design value of said glass pane at any point. The bending strength design value of a glass pane gives the value of the maximum acceptable tensile stress which can be supported by the glass pane.

Because the thermal stresses increase substantially at the corner regions (B) (cf. FIG. 2), the combined stresses, σtot=(σp+σt), induced above each spacer are substantially higher in the corner regions of the VIG than in other regions, in particular of the central region (AC). The insulation properties of a VIG comprising a regular arrangement of discrete spacers across the planar area can be increased by removing discrete spacers in the central region, where the thermal stresses are locally lower, so that increasing the atmospheric pressure stresses at the central region maintains the combined stresses, σtot=(σp+σt), well below the bending strength design value of the glass panes. Inversely, the glass panes composing the VIG can be dimensioned to yield a value of the combined stresses at the corner regions (B) which remains lower than the bending strength design value of the VIG. Since the atmospheric pressure stress, σp, is proportional to the Voronoi cell area, Ai, (i.e., proportional to the square of the pitch for square arrays) the atmospheric pressure stresses can be locally decreased by reducing the Voronoi cell areas (or the pitch for square arrays) at the corner regions. Inversely, FIG. 11 illustrates the atmospheric pressure stress, σp, (short dashed line), thermal stress, σt, long dashed line), and combined stress, σtot=(σp+σt), (solid line) along a diagonal (D), for (a) a VIG according to the present invention having a Voronoi cell area, A(B)=A1, at the corner regions and of A(AC)=2A1 in the remaining regions and (b) of a VIG according to the prior art (P.A.) with an array of discrete spacers arranged periodically over the whole planar area characterized by a Voronoi cell area, A(b)=A1, over the whole planar area. FIG. 11(c) shows a VIG according to the present invention wherein the Voronoi cell area is equal to A(B)=½ A1 at the corner regions (B), and to A(AC)=A1 at the central region.

Comparing FIG. 11(a) with 11(b), starting form a VIG of the prior art designed to resist a maximal total stress, σmax, it can be seen that by increasing the Voronoi cell areas at the central region according to the present invention, where the thermal stresses are negligible, the VIG according to the present invention resists the same maximum stress localized at the corner regions (B) as the prior art VIG, but with a substantially lower number of discrete spacers, which increases the insulating properties of the VIG accordingly.

Concomitantly, comparing FIGS. 11(c) and 11(b), it can be seen that locally increasing the number of discrete spacers per unit area at the corner regions, i.e., locally decreasing the Voronoi cell areas, A(B) to ½ A1, reduces locally the atmospheric pressure stress at the corners, which is proportional to the cell areas, Ai. The maximum atmospheric pressure, σmax, the VIG is exposed to is thus lower for a VIG according to the present invention (cf. FIG. 11(c)) than for a VIG of the prior art (cf. FIG. 11(b)). It results that panes of lower thicknesses can be used for same insulation properties in the same thermal conditions as the VIG's of the prior art.

FIG. 11 shows that a VIG according to the present invention has higher insulating properties for same mechanical resistance to the combined atmospheric pressure and thermal stresses than a VIG of the prior art or, concomitantly, can comprise thinner glass panes for comparable insulation properties than a VIG of the prior art.

The $10^{th}$ percentiles, $S_{AL10}$, $S_{AW10}$, of the cell areas of the Voronoi cells comprised within a longitudinal or transverse region (AL, AW) can be comprised between 25 and 9000 mm$^2$, preferably between 36 and 7200 mm$^2$, more preferably between 121 and 5000 mm$^2$. To give a better idea of the physical meaning of such values of the cell areas, if the discrete spacers are arranged according to a square array, the pitch, λ, corresponding to said cell area ranges would be comprised between 5 and 95 mm, preferably between 6 and 85 mm, more preferably between 11 and 71 mm. Because the levels of combined atmospheric pressure and thermal stresses is lower at the longitudinal and transverse stripe regions (AL, AW) than in the corner regions, the pitches between discrete spacers in those regions can be higher than in the corner areas, and are smaller than or equal to the pitches in the central region (AC).

The $10^{th}$ percentiles, $S_{AL10}$, $S_{AW10}$, of the cell areas of the Voronoi cells comprised within a longitudinal or transverse region (AL, AW) are preferably smaller than the $10^{th}$ percentile, $S_{AC10}$, of the cell areas of the Voronoi cells comprised within the central region (AC).

It is preferred that the $90^{th}$ percentiles, $S_{AL90}$, and $S_{AW90}$, of the cell area of the cells located in each of the first and second longitudinal stripe regions (AL), and/or in each of the first and second transverse stripe regions (AW), respectively, be smaller than the $90^{th}$ percentile, $S_{AC90}$, of the cell area distribution of the cells located in central region (AC). Referring to FIG. 2, it can be seen that the thermal stress levels along the edges and away from the corners (i.e., in regions AL and AW) are clearly lower than in the corner regions (B), but still higher than in the centre of the vacuum insulating glazing, defining the central area (AC). This is in stark contrast with the teaching of DE20201111242U1, discussed in the introduction, which imposes a denser array of discrete spacers (i.e., lower values of the cell areas, Ai, of the corresponding Voronoi cells) along the edges with a centred-hexagonal array of discrete spacers along the edges, than in the centre of the VIG, with a (non-centred) hexagonal array of discrete spacers. This is explained because this document considered a stresses distribution over the area of a VIG resulting from a load applied normal to and at the centre of the vacuum insulating glazing, whilst the present invention focuses on the thermal stresses the VIG undergoes upon application of a severe temperature difference between interior and exterior environments. The temperature of the interior environment is typically from 20 to 25° C. whereas the temperature of the exterior environment can extend from −20° C. in the winter to +35° C. in the summer. Therefore, the temperature difference between the interior environment and the exterior environment can reach more than 40° C. in severe conditions.

The $90^{th}$ percentile, $S_{AC90}$, of the cell areas of the Voronoi cells comprised within the central region (AC) can be comprised between 50 and 9000 mm$^2$, preferably between 100 and 7200 mm$^2$, more preferably between 400 and 5000 mm$^2$, most preferably between 500 and 1800 mm$^2$. Converted in terms of pitch, λ, of a square array of discrete spacers, these values of the cells areas correspond to pitches comprised between 7 and 95 mm, preferably between 10 and 85 mm, more preferably between 20 and 71 mm, most preferably between 22 and 42 mm. The dimensioning of the pitches in the central area should suffice to support the atmospheric pressure stress, σp, and none to moderate values of the thermal stresses, σt, upon exposure to severe thermal gradients.

Figure 9:
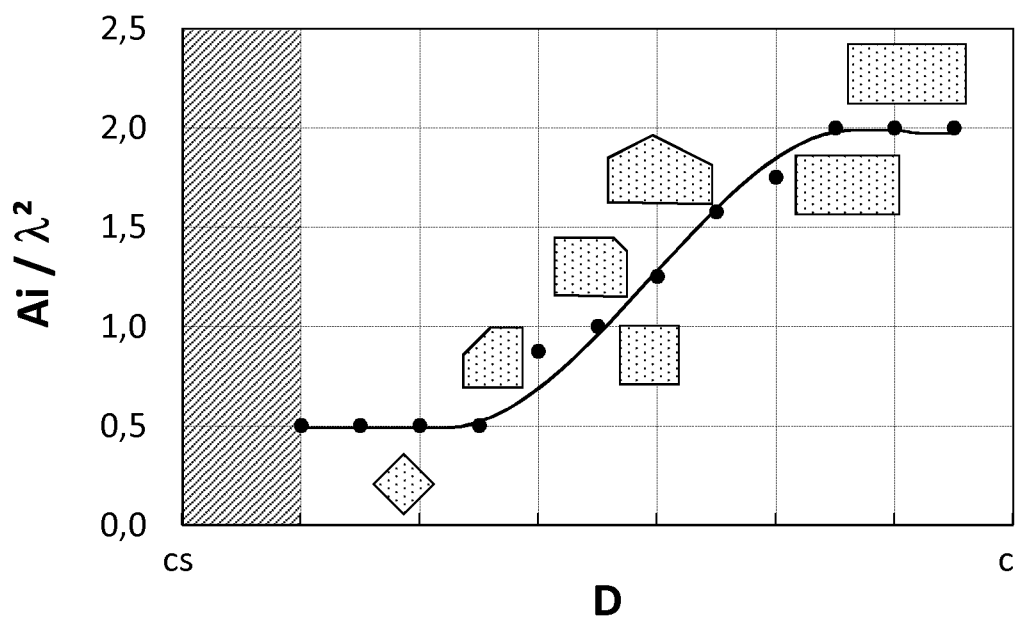
FIG. 9: shows a plot of the cell areas, Ai, of the Voronoi cells intercepting a diagonal, D.

As shown in FIG. 9 for the VIG illustrated in FIG. 5, it is preferred that the cells areas (Ai) intercepting a diagonal of the planar area increase monotonically from a corner to the centre (c) of the planar area. The curve can include one or more plateaux of constant values. In the example illustrated in FIGS. 9 (and 5), the cell areas increase four-fold from a corner (cs) to the centre of the glazing. The shaded area in the plot of FIG. 9 corresponds to the Voronoi cells adjacent to the edges, which are not taken into account.

The present invention provides VIG's that, for a given thickness of the glass panes, can support the highest thermal loads while maintaining a higher insulation than hitherto achieved with state of the art VIG's, because the number of discrete spacers can be reduced substantially, thus reducing accordingly the number of thermal bridges between the first and second glass panes.

The Voronoi cells (Ri) associated with the spacers of a VIG must be dimensioned such that the glass panes composing the VIG resist the highest peaks of stress levels induced on their external surfaces, even though said peaks are very localized at specific regions of the glazing. It follows that, as is the case with typical VIG's known in the art, if a repetitive array of discrete spacers is distributed over the whole planar area, the pitch, λ, must be dimensioned such that the glass panes composing the VIG resist the highest peaks of stresses, even though some regions of the VIG will never be exposed to such high stress levels in their whole service time, as shown in FIG. 2 for the white central region. This leads to the use of a number of discrete spacers which is much larger than strictly required.

Compared with a typical VIG known in the art comprising discrete spacers arranged according to such repetitive pattern over the whole planar area, the number of discrete spacers required for producing a VIG according to the present invention, with discrete spacers concentrated at locations where high peaks of thermal stresses are expected, such as the corner regions (B), can be reduced by 40 to 60%. For example, considering the VIG illustrated in FIG. 5, the reduction of the number of discrete spacers is of the order of 45% compared with a VIG having the discrete spacers distributed over the whole planar area according to an array of centred squares as restricted to the corner areas (B) in FIG. 5. This can result in a gain of thermal insulation of about 30% with a VIG according to the present invention compared with a corresponding typical VIG known in the art.

Figures 10A, 10B:
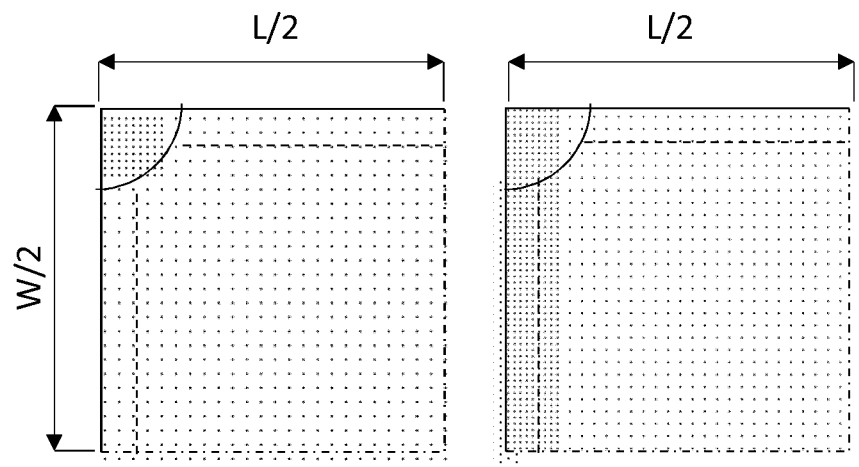
FIG. 10: shows four embodiments of spacers distributions according to the present invention.

FIG. 10 illustrates four embodiments of quarter-VIG's comprising discrete spacers arranged according to the present invention. FIG. 10(a) illustrates a regular square array of discrete spacers with a higher number of discrete spacers per unit area (=density) forming a square at each corner of the planar area. The longitudinal and transverse stripe regions (AL, AW) have the same pattern of discrete spacers as the central area (AC) and have $10^{th}$ percentiles of the cell areas, $S_{AL10}$, $S_{AW10}$, $S_{AC10}$, which are substantially larger than the $10^{th}$ percentile $S_{B10}$, of the cells located in the corner regions (B).

The VIG of FIG. 10(b) is similar to the VIG of FIG. 10(a), but the transverse stripe region (AW) has a higher density of discrete spacers than the central region (AC) and than the longitudinal stripe region (AL). The $10^{th}$ percentile, $S_{AW10}$, of the cell areas of the Voronoi cells located in the transverse stripe region (AW) is the same as the one in the B-regions.

Figures 10C, 10D:
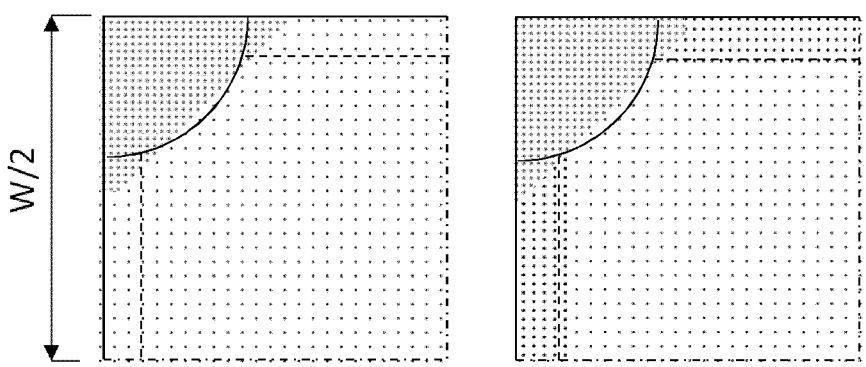

FIG. 10(c)&(d) have a higher density of discrete spacers localized at the corners and arranged to form a triangle sharing a corner with the rectangular planar area. The longitudinal and transverse stripe regions (AL, AW) may or may not have a higher density of discrete spacers as the central region (AC) (cf. FIG. 10(c)&(d), respectively). In FIG. 10(d) the $10^{th}$ percentiles of cell areas in the regions AL, AW, AC, and B are as follows: $S_{B10} < S_{AL10} = S_{AW10} < S_{AC10}$, Method for Producing a VIG According to the Present Invention The present invention also concerns a method for producing a VIG as described above. The method comprises the following steps:

Providing a first and second glass panes (1a, 1b) of known mechanical and thermal properties and of given thickness, d, Calculating the maximum Voronoi cell area, Ai_max, for yielding a maximum acceptable value of the atmospheric stress, e.g., using the formula $\sigma_p = 0.11$ Ai_max/$dj^2$ [MPa], Defining a discrete spacer distribution characterized by the maximum Vonoroi cell area, Ai_max, in the central region (AC), and determining the $10^{th}$ percentile, $S_{AC10}$, of this cell area distribution of discrete spacers in the central region (AC), Defining a discrete spacer distribution in the first and second longitudinal regions (AL) and in the first and second transverse regions (AW) characterized by $10^{th}$ percentiles, $S_{AL10}$, $S_{AW10}$ of the cell areas of the discrete spacers located in the longitudinal and transverse stripe regions (AL, AW), which are lower than or equal to the $10^{th}$ percentile, $S_{AC10}$, of the cell areas of the spacers located in the central region (AC), Defining a discrete spacer distribution in the four corner regions (B) characterized by a $10^{th}$ percentile, $S_{B10}$, of the cell areas of the spacers located in each corner region (B), which is lower than the $10^{th}$ percentile, $S_{AC10}$, $S_{AL10}$, and $S_{AW10}$ of the cell areas of the discrete spacers located in the central region (AC) and in the longitudinal and transverse stripe regions (AL, AW), Positioning k discrete spacers onto a surface of the first glass pane (1a) according to the foregoing discrete spacers distribution, and applying a peripheral bonding seal (4) over said surface, defining a perimeter of a rectangular planar area, Coupling the second glass pane (1b) over the k discrete spacers and peripheral bonding seal (4), leaving a gap between the first and second glass panes and bounded by the peripheral seal, Evacuating gas out of the gap between first and second glass panes to reach a pressure below 0.1 mbar, Wherein $S_{B10}$, $S_{AL10}$ and $S_{AW10}$ are determined ignoring the cells adjacent to an edge of the rectangular planar area. The Voronoi cells adjacent to an edge are ignored because their geometries are interfered with by the presence of the peripheral bonding seal (4).

The Voronoi cell areas of the discrete spacers located in the central region (AC) must be smaller than or equal to the maximum area, Ai_max, lest a portion of the central area breaks under the atmospheric pressure.

The discrete spacers distribution in the corner regions (B) must be suitable for resisting the required sum of atmospheric pressure and thermal stresses, with the thermal stresses concentrating in said corner regions (B). A finite elements analysis could be carried out for every new VIG. As a rule of thumb, however, the $10^{th}$ percentile, $S_{B10}$, of the cell areas of the discrete spacers located in each corner region (B), can be defined as being lower than or equal to 1/m times the $90^{th}$ percentile, $S_{AC90}$, of the cell areas of the discrete spacers located in the central region (AC), wherein m≥1.6, preferably m≥1.8, more preferably m≥2.0.

Glass Panes

The first and second glass panes of the VIG of the present invention can be chosen among float clear, extra-clear or colored glass technologies. The term "glass" is herein understood to mean any type of glass or equivalent transparent material, such as a mineral glass or an organic glass. The mineral glasses used may be irrespectively one or more known types of glass such as soda-lime-silica, aluminosilicate or borosilicate, crystalline and polycrystalline glasses. The glass pane can be obtained by a floating process, a drawing process, a rolling process or any other process known to manufacture a glass pane starting from a molten glass composition. The glass panes can optionally be edge-ground. Edge grinding renders sharp edges into smooth edges which are much safer for people who could come in contact with the vacuum-insulating glazing, in particular with the edge of the glazing. Preferably, at least one of the first and/or second glass panes according to the invention is a pane of soda-lime-silica glass, aluminosilicate glass or borosilicate glass. More preferably and for reasons of lower production costs, the glass pane according to the invention is a pane of soda-lime-silica glass.

Preferably, the composition for the first and/or second glass panes of the VIG of the invention comprises the following components in weight percentage, expressed with respect to the total weight of glass (Comp. A). More preferably, the glass composition (Comp. B) is a soda-lime-silicate-type glass with a base glass matrix of the composition comprising the following components in weight percentage, expressed with respect to the total weight of glass.

|  | Comp. A | Comp. B |
| --- | --- | --- |
| SiO2 | 40-78% | 60-78 wt % |
| Al2O3 | 0-18% | 0-8 wt %, pref 0-6 wt % |
| B2O3 | 0-18% | 0-4 wt %, pref 0-1 wt % |
| Na2O | 0-20% | 5-20 wt %, pref 10-20 wt % |
| CaO | 0-15% | 0-15 wt %, pref 5-15 wt % |
| MgO | 0-10% | 0-10 wt %, pref 0-8 wt % |
| K2O | 0-10% | 0-10 wt % |
| BaO | 0-5% | 0-5 wt %, pref 0-1 wt %. |

Other preferred glass compositions for the first and second glass panes of the VIG of the invention, comprises the following components in weight percentage, expressed with respect to the total weight of glass:

| Comp. C | Comp. D | Comp. E |
|---|---|---|
| $65 \leq SiO2 \leq 78$ wt % | $60 \leq SiO2 \leq 78\%$ | $65 \leq SiO2 \leq 78$ wt % |
| $5 \leq Na2O \leq 20$ wt % | $5 \leq Na2O \leq 20\%$ | $5 \leq Na2O \leq 20$ wt % |
| $0 \leq K2O < 5$ wt % | $0.9 < K2O \leq 12\%$ | $1 \leq K2O < 8$ wt % |
| $1 \leq Al2O3 < 6$ wt %, pref $3 < Al2O3 \leq 5\%$ | $4.9 \leq Al2O3 \leq 8\%$ | $1 \leq Al2O3 < 6$ wt % |
| $0 \leq CaO < 4.5$ wt % | $0.4 < CaO < 2\%$ | $2 \leq CaO < 10$ wt % |
| $4 \leq MgO \leq 12$ wt % (MgO/(MgO + CaO)) $\geq$ 0.5, pref $0.88 \leq$ [MgO/(MgO + CaO)] $< 1$. | $4 < MgO \leq 12\%$ | $0 \leq MgO \leq 8$ wt % K2O/(K2O + Na2O):0.1-0.7. |

In particular, examples of base glass matrixes for the composition according to the invention are described in published in PCT patent applications WO2015/150207A1, WO2015/150403A1, WO2016/091672 A1, WO2016/169823A1 and WO2018/001965 A1.

The glass panes can be of the same dimensions or of different dimensions and form thereby a stepped VIG. In a preferred embodiment of the present invention, the first and the second glass panes comprise first and second peripheral edges, respectively and wherein the first peripheral edges are recessed from the second peripheral edges or wherein the second peripheral edges are recessed from the first peripheral edges. This configuration allows to reinforce the strength of the hermetically bonding seal.

In a preferred embodiment of the present invention and for higher mechanical resistance, the first glass and/or the second glass pane can be a pre-stressed glass. By pre-stressed glass, it means a heat strengthened glass, a thermally toughened safety glass, or a chemically strengthened glass.

Heat strengthened glass is heat treated using a method of controlled heating and cooling which places the outer glass surfaces under compression and the inner glass surface under tension. This heat treatment method delivers a glass with a bending strength greater than annealed glass but less than thermally toughened safety glass. Thermally toughened safety glass is heat treated using a method of controlled heating and cooling which puts the outer glass surface under compression and the inner glass surface under tension. Such stresses cause the glass, when impacted, to break into small granular particles instead of splintering into jagged shards. The granular particles are less likely to injure occupants or damage objects. The chemical strengthening of a glass article is a heat induced ion-exchange, involving replacement of smaller alkali sodium ions in the surface layer of glass by larger ions, for example alkali potassium ions. Increased surface compression stress occurs in the glass as the larger ions "wedge" into the small sites formerly occupied by the sodium ions. Such a chemical treatment is generally carried out by immerging the glass in an ion-exchange molten bath containing one or more molten salt(s) of the larger ions, with a precise control of temperature and time. Aluminosilicate-type glass compositions, such as for example those from the products range DragonTrail® from Asahi Glass Co. or those from the products range Gorilla® from Corning Inc., are also known to be very efficient for chemical tempering.

In some embodiment of the present invention, films such as low emissivity films, solar control films (a heat ray reflection films), anti-reflective films, anti-fog films, preferably a heat ray reflection film or a low emissivity film, can be provided on at least one of the internal surfaces and/or external surfaces of the first and/or second glass panes ($1a$, $1b$) of the vacuum-insulating glazing unit. In a preferred embodiment of the present invention, the internal surface of the second glass pane ($1b$) of the VIG is provided with a heat ray reflection film or a low-E film.

In one embodiment of the present invention, the external surface of the first and/or of the second glass panes ($1a$, $1b$) can be a laminated assembly formed by at least one glass sheet and at least one polymer interlayer, for safety and security reasons. Laminated glass is a type of safety glass that holds together when shattered. In the event of breaking, it is held in place by a thermoplastic interlayer between its two or more layers of glass. The interlayer keeps the layers of glass bonded even when broken, and its high strength prevents the glass from breaking up into large sharp pieces.

Within the laminate assembly, the at least one glass sheet preferably has a thickness, Zs, equal to or greater than 0.5 mm ($Zs \geq 0.5$ mm). The thickness is measured in the direction normal to the pane external surface. The at least one polymer interlayer is a transparent or translucent polymer interlayer comprising a material selected from the group consisting ethylene vinyl acetate (EVA), polyisobutylene (PIB), polyvinyl butyral (PVB), polyurethane (PU), polyvinyl chlorides (PVC), polyesters, copolyesters, polyacetals, cyclo olefin polymers (COP), ionomer and/or an ultraviolet activated adhesive and others known in the art of manufacturing glass laminates. Blended materials using any compatible combination of these materials can be suitable, as well. Reinforced acoustic insulation with acoustic laminated glass are also compatible with the present concept to improve the performances of the window or door. In such case, the polymer interlayer comprises at least one additional acoustic material inserted between two polyvinyl butyral films.

The present invention also applies to any type of glazing unit comprising glass panes (two, three or more) bounding insulating or non-insulating internal spaces (also called multiple glazing units) provided that a partial vacuum is generated in at least one of these internal spaces. Therefore, in one embodiment, to improve the mechanical performances of the VIG of the present invention, a third additional glass pane can be coupled to at least one of the external surfaces of the first and/or second glass panes ($1a$,$1b$) along the periphery of the VIG via a peripheral spacer bar creating in insulating cavity sealed by a peripheral edge seal. Said peripheral spacer bar maintained a certain distance between the third glass pane and the at least one of the external surface one of the first and second glass panes. Typically said spacer bar comprises a dessicant and has typically a thickness comprised between 6 mm to 20 mm, preferably 9 to 15 mm. In general, said second internal volume is filled with a predetermined gas selected from the group consisting of air, dry air, argon (Ar), krypton (Kr), xenon (Xe), sulfur hexafluoride (SF6), carbon dioxide or a combination thereof. Said predetermined gas are effective for preventing heat transfer and/or may be used to reduce sound transmission.

Spacers

The vacuum-insulating glazing unit of the present invention comprises a plurality of discrete spacers, sandwiched between the first and second glass panes ($1a$, $1b$) so as to maintain the two panes separated from one another and thus forming an internal volume, V. The discrete spacers are distributed over the planar area according to an array defined by Voronoi cells as discussed supra.

The discrete spacers can have different shapes, such as cylindrical, spherical, filiform, hourglass shape, C-shaped, cruciform, prismatic shape. It is preferred to use small spacers, i.e. spacers having in general a contact surface to the glass pane equal to or lower than 5 $mm^2$, preferably equal to or lower than 3 mm², more preferably equal to or lower than 1 mm². As indicated above, these dimensions may offer a good mechanical resistance to atmospheric pressure stresses, whilst being aesthetically discreet.

The discrete spacers must be made of a material having a strength sufficient to resist the pressure applied by the internal surfaces of the glass panes under the effect of the atmospheric pressure, they must be capable of withstanding high-temperature processes such as burning and baking and must emit low amounts of gas after the VIG is manufactured. Such a material is preferably a hard metal material, quartz glass or a ceramic material, in particular, a metal material such as iron, tungsten, nickel, chrome, titanium, molybdenum, carbon steel, chrome steel, nickel steel, stainless steel, nickel-chromium steel, manganese steel, chromium-manganese steel, chromium-molybdenum steel, silicon steel, nichrome, duralumin or the like, or a ceramic material such as corundum, alumina, mullite, magnesia, yttria, aluminum nitride, silicon nitride or the like.

Peripheral Bonding Seal

The internal volume, V, between the glass panes (1a, 1b) of the vacuum-insulating glazing unit of the present invention is enclosed within a hermetically bonding seal (4) placed adjacent to the periphery of the glass panes. The hermetically bonding seal is impervious to air or any other gas present in the atmosphere surrounding the VIG and is preferably hard.

Various hermetically bonding seal technologies exist. A first type of seal (the most widespread) is a seal based on a solder glass for which the melting point is lower than the one of the glass composing the glass panes of the glazing unit. The use of this type of seal limits the choice of low-E layers to those that are not degraded by the thermal cycle required to apply the solder glass, i.e. to those that are able to withstand a temperature possibly as high as 250° C.

A second type of seal comprises a metal seal, for example a metal strip having a low thickness (<500 μm) soldered to the periphery of the glazing unit by way of a tie underlayer covered at least partially with a layer of a solderable material such as a soft tin-alloy solder. One substantial advantage of this metal seal relative over the foregoing glass seal is that it can be partially deformed and thus partially absorb the differential expansions between the first and second panes when exposed to a temperature gradient across the thickness of the VIG.

Patent application WO2011/061208 A1 describes one example of a peripheral bonding seal made of metal for a vacuum-insulated glazing unit. The described seal is a metal strip, for example made of copper, soldered by means of a solderable material to an adhesion band provided on the periphery of the glass panes.

Internal Volume

A vacuum of absolute pressure less than 0.1 mbar, preferably less than 0.01 mbar can be created, within the internal volume, V, defined by the first and second glass panes and the set of discrete spacers and closed by the peripheral bonding seal within the VIG of the present invention.

The internal volume of the VIG of the present invention, can comprise a gas, for example, but not exclusively, air, dry air, argon (Ar), krypton (Kr), xenon (Xe), sulfur hexafluoride (SF6), carbon dioxide or a combination thereof. The transfer of energy through an insulating unit having this conventional structure is decreased, because of the presence of the gas in the internal volume, relative to a single glass pane.

The internal volume may also be pumped of any gas, creating therefore a vacuum glazing unit. Energy transfer through a vacuum insulating glazing unit is greatly decreased by the vacuum. To generate the vacuum in the internal volume of the glazing unit, a hollow glass tube bringing the internal volume into communication with the exterior is generally provided on the main face of one of the glass panes. Thus, the partial vacuum is generated in the internal volume by pumping out gases present in the internal volume by virtue of a pump connected to the exterior end of the glass tube.

To maintain a given vacuum level in a vacuum-insulated glazing unit over an extended period of time, a getter may be used in the glazing unit. Specifically, the internal surfaces of the glass panes making up the glazing unit may release over time gases absorbed beforehand in the glass, thereby increasing the internal pressure in the vacuum insulating glazing unit and thus decreasing the vacuum performance. Generally, such a getter consists of alloys of zirconium, vanadium, iron, cobalt, aluminum, etc., and is deposited in the form of a thin layer (a few micrometers in thickness) or in the form of a block or tablet placed between the glass panes of the glazing unit so as not to be seen (for example hidden by an exterior enamel, by a portion of the peripheral impermeable seal, or by a frame). The getter forms, on its surface, a passivation layer at room temperature, and must therefore be heated in order to make the passivation layer disappear and thus activate its alloy gettering properties. The getter is said to be "heat activated".

| REF | FEATURE |
|---|---|
| 1 | Vacuum insulating glazing unit |
| 1a, 1b | First and second glass panes |
| 4 | Peripheral bonding seal |
| A | Complementary region |
| AC | Central region |
| Ai | Area of the Voronoi cell Ri |
| AL | Longitudinal stripe region |
| AW | Transverse stripe region |
| B | Corner region |
| c | Centre of the rectangular planar area |
| cs | (extrapolated) corner of the rectangular planar area |
| d | VIG thickness |
| D | Diagonal of the rectangular planar area |
| k | Number of discrete spacers |
| L | Length of the rectangular planar area |
| n | Rank |
| N | Total number of values of a list |
| P | Percentile |
| Pi | Discrete spacer i |
| Rb | Radius of the B-region |
| Ri | Voronoi cell associated with spacer Pi |
| Sxp | $p^{th}$ percentile of the cell areas located in a region x = A, AL, AW, or B |
| W | Width of the rectangular planar area |
| X1, X2 | Longitudinal and transverse axes |
| $\lambda, \lambda_{max}$ | Pitch, and maximal pitch for a given resistance to atmospheric pressure stress, σp |
| σp, σt | Atmospheric pressure and thermal stresses |

The invention claimed is:

1. A vacuum insulating glazing unit (VIG) comprising a planar area and comprising:
   (a) a first glass pane and a second glass pane;
   (b) k discrete spacers (Pi) distributed over the planar area and positioned between the first and second glass panes and maintaining a distance between the first and the second glass panes, each of said discrete spacers (Pi) defining a cell (Ri) having a cell area (Ai) and forming in combination with the cells associated with all the discrete spacers, a Voronoi tessellation characterized by a cell area distribution wherein k∈ℕ and k>8;

(c) a peripheral bonding seal hermetically sealing the distance between the first and second glass panes defining an internal volume, V, enclosed between the first and second glass panes and bounded by an inner perimeter of the peripheral bonding seal defining the planar area, the inner perimeter having a substantially rectangular geometry extending over a length, L, along a longitudinal axis, X1, and over a width, W, along a transverse axis, X2, normal to the longitudinal axis, X1, with L≥W, wherein the internal volume is under vacuum, wherein the planar area is divided as follows:
four corner regions, each having a quarter-circular geometry of radius, Rb<W/2, and each centred on a corner of the rectangular inner perimeter of the peripheral seal, and
a complementary region covering the planar area excluding the four corner areas and itself divided into,
   A first longitudinal stripe region extending between first and second corner regions and a second longitudinal stripe region extending between third and fourth corner regions, each longitudinal stripe region extending along the longitudinal axis, X1, adjacent to a longitudinal edge of the planar area and having a width measured from the longitudinal edge along the transverse axis, X2, equal to 0.1 W,
   A first transverse stripe region extending between the first and the third corner regions and a second transverse stripe region extending between the second and fourth corner regions, each transverse stripe region extending along the transverse axis, X2, adjacent to a transverse edge of the planar area and having a width measured from the transverse edge along the longitudinal axis, X1, equal to 0.1 W,
   A central region covering the area of the complementary region excised of the first and second longitudinal stripe regions and of the first and second transverse stripe regions, wherein, a $10^{th}$ percentile, $S_{B10}$, of the cell area distribution of the cells located in each of the four corner regions is smaller than $10^{th}$ percentiles, $S_{AC10}$, and $S_{AL10}$ and/or $S_{AW10}$, of the cell area distributions of the cells located in the central region (AC), and in each of the first and second longitudinal stripe regions (AL), and/or in each of the first and second transverse stripe regions (AW), respectively, and in that, the $10^{th}$ percentile, $S_{AC10}$, of the cell area distributions of the cells located in the central region (AC), is larger than or equal to the $10^{th}$ percentiles, $S_{AL10}$ and $S_{AW10}$ of the first and second longitudinal and transverse stripe regions (AL, AW), wherein $S_{B10} S_{AL10}$, and $S_{AW10}$ are determined ignoring the cell areas of all the cells adjacent to the inner perimeter, and wherein a cell is enclosed in a region (AC, AL, AW, B),
   if the corresponding discrete spacer is comprised within said region, or
   in case the corresponding discrete spacer is at an intersection between two regions (AC, AL, AW, B), the cell is enclosed in a region comprising a largest fraction of the cell area, and
   in case the corresponding discrete spacer is at an intersection between two regions (AC, AL, AW, B) and the cell area is evenly distributed between the two regions, said cell area is ignored for the determination of the $10^{th}$ percentiles, $S_{B10}$, $S_{AC10}$, $S_{AL10}$, and $S_{AW10}$.

2. The vacuum insulating glazing unit according to claim 1, wherein cell areas of all cells located in each of the four corner regions, which are adjacent to the inner perimeter are smaller than or equal to cell areas of all cells directly adjacent thereto.

3. The vacuum insulating glazing unit according to claim 1, wherein a $90^{th}$ percentile, $S_{AC90}$, of the cell area distribution of the cells located in the central region (AC) is larger than m times the $10^{th}$ percentile, $S_{B10}$, of the cell area distribution of the cells located in each of the four corner regions (B) ($S_{AC90}$>$mS_{B10}$), wherein m≥1.6.

4. The vacuum insulating glazing unit according to claim 3, wherein $S_{AC90}$ is comprised between 50 and 9000 mm.

5. The vacuum insulating glazing unit according to claim 4, wherein $S_{AC90}$ is comprised between 400 and 5000 mm$^2$.

6. The vacuum insulating glazing unit according to claim 3, wherein $90^{th}$ percentiles, $S_{AL10}$, and $S_{AW90}$, of the cell area distributions of the cells located in each of the first and second longitudinal stripe regions (AL), and/or in each of the first and second transverse stripe regions (AW), respectively, are smaller than the $90^{th}$ percentile, $S_{AC90}$, of the cell area distribution of the cells located in central region (AC).

7. The vacuum insulating glazing unit according to claim 3, wherein the $90^{th}$ percentile, $S_{AC90}$, of the cell area distribution of the cells located in the central region (AC) is larger than in times the $10^{th}$ percentile, $S_{B10}$, of the cell area distribution of the cells located in each of the four corner regions (B) ($S_{AC90}$>$mS_{B10}$), wherein m≥1.8.

8. The vacuum insulating glazing unit according to claim 1, wherein Rb is comprised between 20% and 40% of the width, W.

9. The vacuum insulating glazing unit according to claim 8, wherein Rb is comprised between 30%±5% of the width, W, and comprised between 15% and 35% of the length, L.

10. The vacuum insulating glazing unit according to claim 1, wherein $S_{B10}$ is comprised between 20 and 5000 mm.

11. The vacuum insulating glazing unit according to claim 10, wherein $S_{B10}$ is comprised between 100 and 2500 mm.

12. The vacuum insulating glazing unit according to claim 1, wherein the $10^{th}$ percentiles, $S_{AL10}$, $S_{AW10}$, of the cell areas of the Voronoi cells comprised within a longitudinal or transverse region (AL AW) are comprised between 25 and 9000 mm$^2$.

13. The vacuum insulating glazing unit according to claim 12, wherein the $10^{th}$ percentiles, $S_{AL10}$, $S_{AW10}$, of the cell areas of the Voronoi cells comprised within a longitudinal or transverse region (AL, AW) are comprised between 121 and 5000 mm$^2$.

14. The vacuum insulating glazing unit according to claim 1, wherein the cells areas (Ai) intercepting a diagonal of the planar area increase monotonically from a corner to a centre (c) of the planar area.

15. The vacuum insulating glazing unit according to claim 1, wherein at least one of the first and second glass panes is made from soda-lime-silica glass, aluminosilicate glass or borosilicate glass.

16. The vacuum insulating glazing unit according to claim 1, wherein the first and second glass panes have an internal surface respectively, and an external surface respectively, wherein the internal surfaces are facing the internal volume, V, and wherein at least one of the internal surfaces and external surfaces is provided with at least a heat ray reflection film or a low-emissivity film.

17. The vacuum insulating glazing unit according to claim 1, wherein the first glass pane and second glass pane have an external surface, respectively, wherein the external surfaces are facing an exterior of the vacuum insulating glazing unit and wherein at least one of the external surfaces is laminated to at least one glass sheet by at least one polymer interlayer forming a laminated assembly.

18. The vacuum insulating glazing unit according to claim 1, wherein the first glass pane and second glass pane have an external surface, respectively, wherein at least one of the external surfaces of the first and second glass panes is coupled to a third glass pane along a periphery of the vacuum insulating glazing unit via a peripheral spacer bar, creating an insulating cavity sealed by a peripheral edge seal.

19. A method for producing a vacuum insulating glass according to claim 1, comprising:
  producing the vacuum insulated glass of claim 1, such producing comprising the following:
  Providing first and second glass panes of known mechanical and thermal properties and of given thickness, d,
  Calculating a maximum Voronoi cell area, Ai_max, for yielding a maximum acceptable value of the atmospheric pressure stress,
  Defining a discrete spacer distribution characterized by the maximum Voronoi cell area, Ai_max, in the central region (AC), and determining the $10^{th}$ percentile, $S_{AC10}$, of this cell area distribution of discrete spacers in the central region (AC),
  Defining a discrete spacer distribution in the first and second longitudinal regions (AL) and in the first and second transverse regions (AW) characterized by $10^{th}$ percentiles, $S_{AL10}$, $S_{AW10}$ of the cell areas of the spacers located in the longitudinal and transverse stripe regions (AL, AW), which are lower than or equal to the $10^{th}$ percentile, $S_{AC10}$, of the cell areas of the discrete spacers located in the central region (AC),
  Defining a discrete spacer distribution in the four corner regions characterized by a $10^{th}$ percentile, $S_{B10}$, of the cell areas of the discrete spacers located in each corner region, which is lower than the $10^{th}$ percentile, $S_{AC10}$, $S_{AL10}$, and $S_{AW10}$ of the cell areas of the spacers located in the central region (AC) and in the longitudinal and transverse stripe regions (AL, AW),
  Positioning k discrete spacers onto a surface of the first glass pane according to the foregoing discrete spacers distribution, and applying a peripheral bonding seal over said surface, defining a perimeter of a rectangular planar area,
  Coupling the second glass pane over the k discrete spacers and peripheral bonding seal, leaving a gap between the first and second glass panes and bounded by the peripheral bonding seal, and
  Evacuating gas out of the gap between first and second glass panes to reach a pressure below 0.1 mbar,
  Wherein $S_{B10}$ is determined ignoring the cells adjacent to an edge of the rectangular planar area, and wherein $S_{AL10}$ and $S_{AW10}$ are determined ignoring the cells adjacent to an edge of the rectangular planar area.

20. The method according to claim 19, further comprising:
  determining the $90^{th}$ percentile, $S_{AC90}$, of the cell areas of discrete spacers located in the central region (AC), and
  defining a discrete spacer distribution in the four corner regions characterized by a $10^{th}$ percentile, $S_{B10}$, of the cell areas of the discrete spacers located in each corner region, which is lower than or equal to 1/m times the $90^{th}$ percentile, $S_{AC90}$, of the cell areas of the spacers located in the central region (AC), wherein m≥1.6.

* * * * *